United States Patent [19]

Radtke

[11] Patent Number: 4,956,556

[45] Date of Patent: Sep. 11, 1990

[54] RADIATION SCINTILLATION DETECTOR

[75] Inventor: Jeffrey L. Radtke, Madison, Wis.

[73] Assignee: Siemens Analytical X-Ray Instruments, Inc., Madison, Wis.

[21] Appl. No.: 271,239

[22] Filed: Nov. 14, 1988

[51] Int. Cl.[5] .......................... G01T 1/20; G01T 1/203
[52] U.S. Cl. ................................. 250/368; 250/361 R; 250/367
[58] Field of Search ................... 250/369, 368, 361 R, 250/487.1, 366, 367

[56] References Cited

U.S. PATENT DOCUMENTS

| 3,859,532 | 1/1975 | Luitwieler | 250/369 |
| 3,890,505 | 6/1975 | Olson | 250/361 R |
| 3,898,463 | 8/1975 | Noakes | 250/369 |
| 3,944,832 | 3/1976 | Kalish | 250/361 R |
| 4,049,966 | 9/1977 | Luitwieler, Jr. | 250/369 |
| 4,631,410 | 12/1986 | Nickles | 250/361 R |
| 4,788,436 | 11/1988 | Koechner | 250/483.1 |

OTHER PUBLICATIONS

Brochure from Nuclear Enterprises America, "Plastic Liquid and Crystal Scintillators", Technical Data, "Table of Physical Constants of Scintillators", undated.
Hurlbut, C. R., "Plastic Scintillators A Survey", presented at the American Nuclear Society Winter Meeting. (Nov. 1985), pp. 1–17.
Riley, R. J. and A. G. Wright, "The Effect of Photomultiplier Afterpulses in Coincidence Systems", *Journal of Physics E: Scientific Instruments* (1977), vol. 10, pp. 873–874.
Morton, G. A., et al., "Afterpulses in Photomultipliers", *IEEE Transactions on Nuclear Science* (Feb. 1967), pp. 443–448.
Young, Andrew T., "Cosmic Ray Induced Dark Current in Photomultipliers", *The Review of Scientific Instruments*, (Nov. 1966), vol. 27, No. 11, pp. 1472–1481.
Lamaze, G. P., et al., "After-Pulse Suppression for 8850 and 8854 Photomultipliers", *Nuclear Instruments and Methods* (1975), vol. 123, pp. 403–404.
Hall, S. J. and J. McKeown, "Reduction of Afterpulsing in a Photomultiplier", *Nuclear Instruments and Methods* (1973), vol. 112, pp. 545–549.
Shin, Y. M., et al., "Satellite Pulses From Philips 58 AVP Photomultiplier and Their Effect on (y,n) Time-of-Flight Spectroscopy", *Nuclear Instruments and Methods* (1968), vol. 58, pp. 353–355.
W. T. Welford and R. Winston, "The Optics of Nonimaging Concentrators . . . Light Solar Energy," Academic Press, 1978, pp. 47–102.
Stevens, S. S. and J. W. Longworth, "Late Output Pulses From Fast Photomultipliers", *IEEE Transactions on Nuclear Science*, NS19, No. 1, pp. 356–359, 1972.
Martinez, P. and F. Senftle, "Effect of Crystal Thickness and Geometry on the Alpha-Particle Resolution of CsI(T1)", *The Review of Scientific Instruments*, vol. 31, No. 9 (Sep. 1960), pp. 974–977.

(List continued on next page.)

Primary Examiner—Carolyn E. Fields
Attorney, Agent, or Firm—Foley & Lardner

[57] ABSTRACT

A radiation scintillation detector which is particularly suited for X-ray detection is formed as a solid body of rotation about a central axis of a scintillator medium. The body includes at least one internal reflective surface, and at least one substantially planar surface through which the light is substantially transmitted to a photomultiplier tube. The curvilinear axial cross-section of the internal reflective surface is formed such that substantially any light originating from an area in proximity to a point of most probable emission within the body and intersecting the internal reflective surface is totally reflected internally. The photomultiplier tubes will receive most of the light emitted, by virtue of the decreasing taper of each internal reflective surface as it approaches the planar surface. A detector comprising two portions, which are joined integrally back-to-back to each other, and which each include an internal reflective surface, internally reflects substantially all photons striking the reflective surface to the photomultiplier tubes.

20 Claims, 5 Drawing Sheets

OTHER PUBLICATIONS

Hine, G. and J. Cardarelli, "Conical Plastic Scintillators Show Total Gamma Absorption", *Nucleonics* (Sep. 1960), pp. 92–100.

Martiens, C., "Fast Single Channel Analyzer with Integrated Circuits", *The Review of Scientific Instruments*, vol. 46, No. 4, (Apr. 1975), pp. 486–487.

Adlam, J. and J. Burcham, "The Variation of the Conversion Efficiency of an NE 102A Plastic Scintillator with X-Ray Energy in the Range 1.8–4.5 keV", *J. Sci. Instrum.* (1966), vol. 43, pp. 93–96.

Takahashi, T. and S. Kikuta, "X-Ray Detector Using Plastic Scintillators", pp. 137–143, (1986), *X-Ray Instrumentation for the Photon Factory*.

Meyerott, A., et al., "Plastic Scintillator Response to 1–10 keV Photons", The Review of Scientific Instruments, vol. 35, No. 6 (Jun. 1964), pp. 669–672.

Eriksson, L. et al., "Comparative Studies on Plastic Scintillators–Applications to Low Energy High Rate Photon Detection", Nuclear Instruments and Methods, vol. 122 (1974), pp. 373–376.

Johnson, L., "A High Rate MaI Detector System", *IEEE Transactions on Nuclear Science*, vol. NS-26, No. 1 (Feb. 1979), pp. 465–475.

Caria, M., et al., "On the Detection of Low Energy Rays with Plastic Scintillators", Nuclear Instruments and Methods, vol. 188 (1981), pp. 473–474.

Becker, J., et al., "On the Use of Tin-Loaded Plastic Scintillators in Mossbauer Spectroscopy", *Nuclear Instruments and Methods*, vol. 123 (1975), pp. 199–201.

Knoll, G., *Radiation Detection and Measurement*, John Wiley, N.Y., pp. 240–271.

RADIATION SCINTILLATION DETECTOR

FIELD OF THE INVENTION

This invention pertains generally to the field of devices which are used for measuring radioactivity, and pertains particularly to detectors which are effective in measuring X-ray activity.

BACKGROUND OF THE INVENTION

Various types of radiation scintillation detectors are available for use in the detection of ionizing radiation. Although inorganic detectors tend to emit the most light when detecting radiation and generally have a light output which is linear with respect to the radiation, the inorganic detectors tend also to have a relatively slow response time and decay time thereby making it difficult to distinguish events. Often it is therefore preferable to use organic scintillator material when counting X-ray photons at high rates. However, organic radiation scintillation detectors tend to give off comparatively less scintillation light than the inorganic radiation scintillation detectors. This can pose a problem when fairly low energy level radiation, such as X-rays, is being detected by the detector. Therefore, when using an organic scintillator material, it is desirable that substantially all the light which is emitted be collected.

In Martinez, et al., "Effect of Crystal Thickness and Geometry on the Alpha-Particle Resolution of CsI (T1)", *The Review of Scientific Instruments*, pp. 974–977 (September 1960), the use of a single truncated cone crystal radiation scintillation detector is discussed. The publication states that if the crystal is beveled at the critical angle, any light originating in the light source area will strike the sides of the crystal at greater than the critical angle and will be internally reflected down through the bottom of the crystal. However, some of the emitted light will escape out the small planar surface on the end of the truncated cone opposite the end facing the photomultiplier tube. An early discussion of truncated conical plastic radiation scintillation detectors having sides which are surrounded with aluminum oxide or foil is contained in Hine, et al., "Conical Plastic Scintillators Show Total Gamma Absorption", *Nucleonics*, pp. 92, 94, 96, 98, and 100, (September 1960). This publication states that it is difficult to choose the best angle for a cone of given thickness.

Generally, coating the sides of a radiation scintillation detector with a reflector such as foil or aluminum oxide is not as efficient for reflecting light as total internal reflectance. In order to maximize total internal reflectance of scintillation light, the sides of the radiation scintillation detector may have to be beveled at a fairly extreme angle so that even the light emitted toward the top of the detector is totally reflected internally toward the bottom surface of the detector. Such single conical radiation scintillation detectors may be fairly narrow at the top and quite wide at the bottom. As a result, the light which is being transmitted through the bottom of the scintillator may be more diffuse.

U.S. Pat. Nos. 3,890,505 to Olson, 3,898,463 to Noakes, and 3,944,832 to Kalish all disclose cylindrical scintillation detectors which are coupled to photomultiplier tubes at both ends. The detectors are coated with a reflective coating or covering to reflect photon emissions internally.

SUMMARY OF THE INVENTION

In accordance with the present invention, an X-ray scintillation detector has improved collection of emitted photons and reduced diffusion by having a truncated cone shaped scintillator with a taper which decreases in the direction of the major planar surface through which photons pass to the photomultiplier tube. Additionally, the detector may be formed into an integral double truncated conical shape, thereby eliminating the small planar surface through which photons could escape without detection. With such a double conical detector, two photomultipliers are used to detect the photons.

The radiation scintillation detectors of the invention are preferably formed as a solid body of rotation about a central axis of a scintillator medium having a particular index of refraction. First and second embodiments of radiation scintillation detectors of the invention each include two portions located on opposite sides of a plane perpendicular to the central axis. Radiation normally is directed at the detector along the plane between the two portions toward the central axis. The point of most probable emission of photons within the detector is usually located just inside the detector near where the radiation hits the detector, thus along the plane defining boundary between the two portions. Each portion includes an internal reflective surface and a substantially planar surface at its outer end through which the light is substantially transmitted. The first and second preferred detectors are similar in structure and function, except that the shapes of their internal reflective surfaces differ. In axial cross-section, the internal reflective surfaces in the first detector preferably are shaped curvilinearly such that light originating in an area in proximity to the point of most probable emission, and which intersects the internal reflective surface, is substantially totally reflected internally. In the second detector, the internal reflective surfaces in axial cross-section are shaped linearly, yet such that substantially all the emitted light is totally internally reflected. Generally, any line segments originating from the area in proximity to the point of most probable emission and ending on the internal reflective surface, anywhere along that surface, must have an angle of incidence to the surface about at least as great as the critical angle of incidence of the internal reflective surface. The critical angle of incidence of the internal reflective surface is determined by the scintillator medium used, the surrounding medium adjacent to the body along the internal reflective surface, and the particular wavelength of the radiation which is emitted by the scintillator material.

In the first detector, each internal reflective surface in axial cross-section forms two continuous curves which are symmetrical with respect to the central axis of the detector body. Each curve everywhere has a slope dy/dx with absolute value, which is about at least equal to an absolute value of tan $$\left(\alpha \pm \frac{\pi}{2} \pm \theta\right),$$

where $\theta$ is the critical angle of incidence to the internal reflective surface. The y axis is defined by the central axis of the scintillator body, and the x axis in each axial cross-section is defined by a line perpendicular to the central axis and intersecting the location where the radiation enters the detector. The angle α is the angle measured counterclockwise between the x-axis as directed to the right and a line segment from the area in proximity to the point of most probable emission to the internal reflective surface. In the second preferred detector, the internal reflective surfaces in each of the two portions in axial cross-section define lines instead of curves.

In the first or second preferred radiation scintillation detector, substantially all of the light is eventually directed toward either of the two larger planar surfaces so that it may be transmitted to one of two photomultiplier tubes. Thus the loss of photons through the small planar end is overcome. Additionally, the first preferred radiation scintillator detector has a decreasing taper approaching the ends with the large planar surfaces. The decreasing taper of the detector approaching the large planar surfaces limits the size of those planar surfaces from being inconveniently large, or the absorption region from being inconveniently thin. It is desirable to keep the large planar surfaces small, since the photocathode area is proportional to the dark current in the photomultiplier. The boundary conditions, which determine a solution to the differential equation describing the curvilinear surface, are determined by the thickness of the scintillator material required to stop most of the radiation of interest, and the diameter of the photomultiplier photocathode. The second preferred detector does not have a decreasing taper, and therefore is less expensive to manufacture.

Radiation scintillation detectors may also be formed similar to the first preferred radiation scintillation detector but having only one quasi-conical portion which in turn includes a single internal reflective surface and one large substantially planar surface. At the other end of the detector body is a small planar surface. The radiation may enter the detector through the small planar surface. Alternatively, radiation may be received into the detector through the surface forming the internal reflective surface. In either case, some of the photons emitted may be lost through the small planar surface. Therefore, for most efficient light collection, it is preferred that the axial cross-section of the internal reflective surface be curved with decreasing taper approaching the large planar surface, such that light emitted from the area in proximity to the point of most probable emission intersects the internal reflective surface at an angle of incidence of about at least the critical angle of incidence for that surface. Thus, even though some of the light may be transmitted through the smaller planar surface, substantially all of the light emitted within the detector eventually is directed toward the large planar surface to be transmitted to the photomultiplier tube, with the size of the large planar surface being minimized.

Further objects, features, and advantages of the invention will be apparent from the following detailed description taken in conjunction with the accompanying drawings.

DESCRIPTION OF THE PREFERRED EMBODIMENTS

Figure 1:
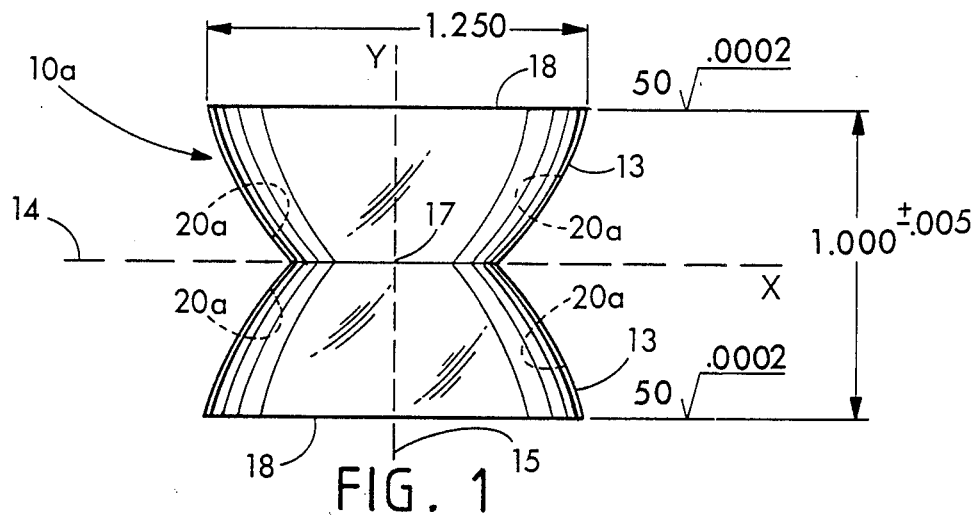
FIG. 1 shows a front elevation view of a first preferred radiation scintillation detector.
Figure 4:
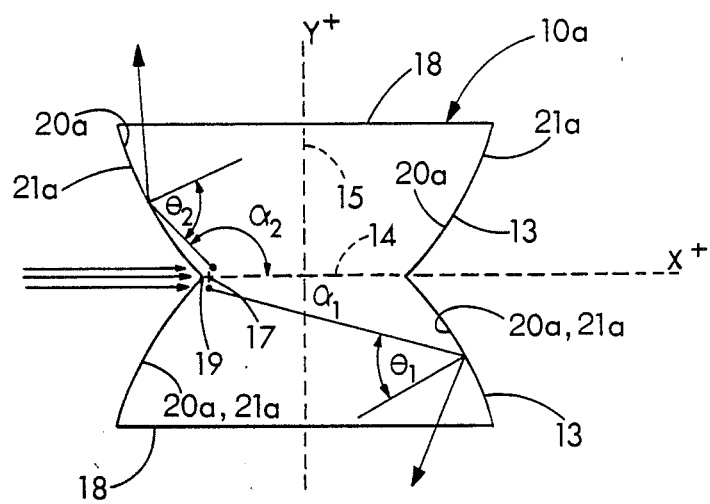
FIG. 4 shows a schematic axial cross-sectional view of the first detector.
Figure 6:
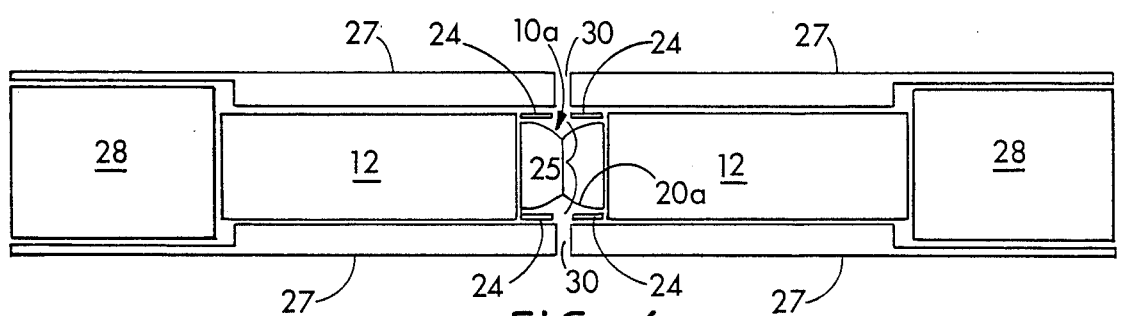
FIG. 6 shows a somewhat schematic axial cross-sectional view of X-ray detection apparatus including the first scintillation detector, the mounting cell, two photomultiplier tubes, and two preamplifiers contained within a housing.

Referring to the drawings, a first preferred radiation scintillation detector is shown generally at 10a in FIG. 1, which may be used for detecting radiation, and in particular for detecting X-rays. As shown in FIG. 6, the first detector 10a is adapted for use with two photomultiplier tubes 12. Thus the detector 10a includes two portions located on opposite sides of a central plane 14 which is perpendicular to the central axis 15 of the scintillator 10a. Quasi-conical portions 13 of the scintillator are symmetrical about the plane 14. The radiation scintillation detector 10a is preferably formed as a solid body of rotation about the central axis 15, of a solid organic scintillator medium, such as BC-400, BC-404, BC-450, or BC-452 plastic scintillator material which is manufactured by Bicron, Inc.; NE-102, NE-104, or Pilot B plastic scintillator material which is manufactured by Nuclear Enterprises America; or other similar materials. The scintillation detector 10a includes a point of most probable light emission at 17 near the location 19 where the radiation strikes the detector 10a where the two portions 13 are integrally joined, as shown in FIG. 4. The detector 10a also includes two large planar surfaces 18 at the outward ends of the portions 13. Additionally, each portion 13 includes an internal reflective surface 20a which is curvilinear in axial cross-section.

When radiation hits the detector, photons are emitted from an area centered on the point of most probable light emission. This area has a width in an axial direction about equal to the width of the spatial radiation distribution onto the detector. Thus any photon emitted from this area is said to be emitted "in proximity to" the point of most probable light emission If the radiation directed at the detector is in the form of a beam directed through a collimator aperture, the width of the spatial radiation distribution onto the detector and the axial width of the area in proximity to the point of most probable emission will be about equal to the diameter of the collimator aperture.

Figure 3:
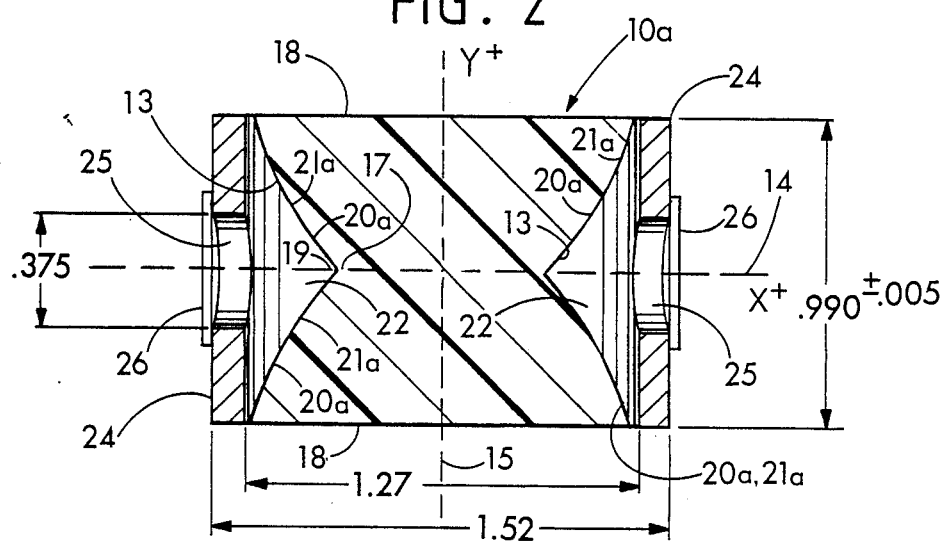
FIG. 3 shows a longitudinal section view of the first detector taken along the line 3—3 of FIG. 2.

As shown in FIGS. 1, 3 and 4, the internal reflective surface 20a of each portion 13, in axial cross-section, forms two continuous curves 21a which are symmetrical to each other with respect to the central axis 15. The continuous curves 21a are formed such that substantially any light which is emitted from an area in proximity to the point of most probable light emission 17 and which intersects one of the internal reflective surfaces 20a is totally reflected internally. In the first detector 10a, the internal reflective surfaces 20a are of decreasing taper as the large planar surfaces 18 are approached. When a beam of X-rays is directed into the detector 10a near the point 17, the detector 10a emits photons from the scintillator medium from an area centered around that point 17. Some of the photons proceed toward the planar surfaces 18 through which the photons are transmitted to the photo-multiplier tubes 12. On the other hand, many of the photons are directed toward one of the internal reflective surfaces 20a which they intersect at an angle of incidence greater than the critical angle of incidence. Since the photons intersect the internal reflective surfaces 20a at greater than the critical angle of incidence, the photons are substantially totally reflected internally. Generally, after one internal reflection, the photons proceed toward the large planar surfaces 18 where they are transmitted to the photo-multiplier tubes 12.

It is important that the photons intersect the planar surfaces 18 at an angle of incidence less than the critical angle of incidence. This, of course, is dependent upon the materials adjacent to the surface 18. Often silicon oil is used between the detector 10a and photomultiplier tube. Preferably all surfaces on the detector 10a are polished until they are transparent.

The internal reflective surfaces 20a each are formed so that, in axial cross-section, any line segments directed from an area in proximity to the point of most probable light emission at 17 to the internal reflective surface 20a, anywhere along that surface 20a, have an angle of incidence to the surface 20a which is greater than or equal to the critical angle of incidence. The critical angle of incidence is determined by the scintillator medium, the surrounding medium 22 (which often is air) adjacent to the body along the internal reflective surfaces 20a, and the wave length of the light emitted by the scintillator material. In order for the radiation scintillation detector 10a to be most effective, the line segments from the area in proximity to the point 17 which are directed to the internal reflective surfaces 20a anywhere along those surfaces must each have an angle of incidence to the surfaces 20a about at least as great as the critical angle of incidence.

As shown in FIGS. 1, 3 and 4, each portion 13 in axial cross-section forms the two continuous curves 21 which are symmetrical with respect to the central axis. Each of these continuous, decreasingly tapered curves everywhere has a slope dy/dx with an absolute value which is less than or equal to the absolute value of tan $$\left( \alpha \pm \frac{\pi}{2} \pm \theta_c \right),$$

where $\theta_c$ is the critical angle of incidence with the internal reflective surfaces 20a, and the y-axis is defined by the central axis and the x-axis in each axial cross-section is perpendicular to the central axis. The angle $\alpha$ is the angle measured counter-clockwise between the x-axis going rightwardly in a positive direction, and any line segment from an area in proximity to the point 17 to the internal reflective surfaces 20a. For effective operation of a radiation scintillation detector 10a, when $-\pi/2 < \alpha < \pi/2$, each continuous curve 21a substantially everywhere will have a slope dy/dx with an absolute value which is at least equal to the absolute value of tan $$\left( \alpha - \frac{\pi}{2} - \theta_c \right),$$

and when $\pi/2 < \alpha < 3\pi/2$, each continuous curve 21a substantially everywhere will have a slope dy/dx with an absolute value which is less than or equal to the absolute value of tan $$\left( \alpha + \frac{\pi}{2} + \theta_c \right).$$

The critical angle $\sigma_c$, the angle $\alpha$ and the x and y axes are shown in FIGS. 3 and 4.

By way of example, a chart of the diameter of the first detector at various values of y for an exemplary embodiment is given below:

| y (inches) | Diameter (inches) |
|---|---|
| .50 | 1.25 |
| .40 | 1.18 |
| .30 | 1.09 |
| .20 | 0.97 |
| .10 | 0.83 |
| .00 | 0.67 |
| −.10 | 0.83 |
| −.20 | 0.97 |
| −.30 | 1.09 |
| −.40 | 1.18 |
| −.50 | 1.25 |

Figure 2:
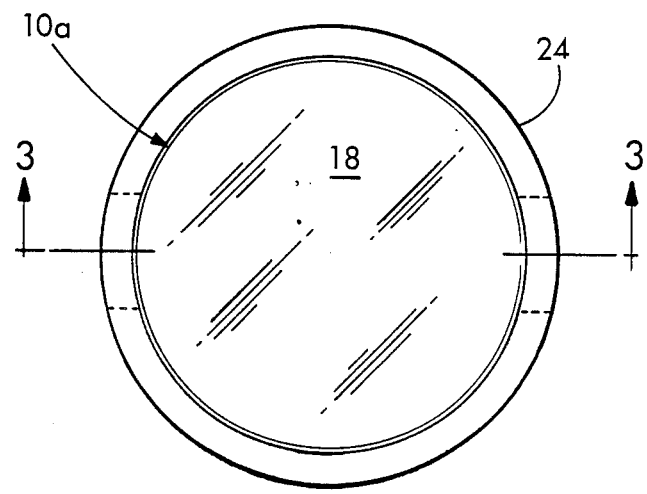
FIG. 2 shows a top plan view of the first detector positioned within a cell for containing the detector.

As shown in FIGS. 2 and 3, the scintillation detector 10a is preferably contained within an aluminum mounting cell 24 formed of a wall which is cylindrical in shape and has two X-ray windows 25 on opposite sides of the detector 10a. As shown, the windows 25 are located 180° apart and are centered between the two portions 13 to allow access by the X-rays toward the center of the detector 10a, the location near where the point 17 of most probable light emission will be. Preferably, the windows 25 may be covered by beryllium, nickel, plastic or aluminum as shown at 26. The windows must be opaque to visible light, if the system is to be operated in an illuminated environment. There are two windows, 180° apart, in the cell 24 to allow for the entry and exit of high energy radiation which passes entirely through the plastic radiation scintillation detector 10a, which may then be measured by an additional detecting device near the second window 25 from which the high energy radiation exits. The detection of such high energy radiation has particular application in X-ray fluorescence spectroscopy.

As shown in FIG. 6, the mounting cell 24 and scintillation detector 10a are contained within a housing 27 which may be formed, for example, from bearing bronze hollow round bar stock. As shown, the housing 27 surrounds and contains the radiation scintillation detector 10a, the cell 24, and the two photo-multiplier tubes 12. Additionally, the housing 27 may also contain the two preamplifiers 28. As shown in FIG. 6, the housing has two apertures 30 which are positioned co-linearly with the cell windows 25 to allow access to the scintillation detector 10a by a beam of X-rays. The detector, cell and housing together form an apparatus which is particularly suited for X-ray detection.

Figure 5:
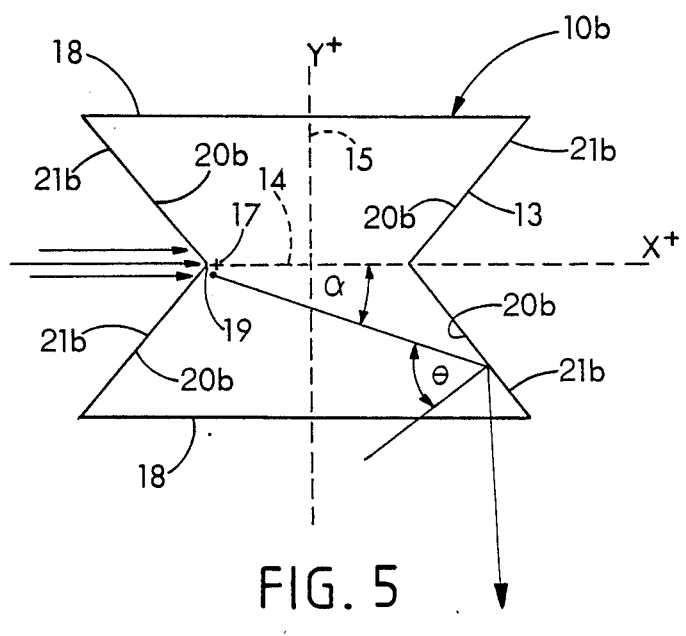
FIG. 5 shows a schematic axial cross-sectional view of a second preferred radiation scintillation detector.

A second embodiment of a scintillation detector in accordance with the invention is shown schematically at 10b in FIG. 5. The second detector 10b is similar to the first scintillation detector 10a, except that its two internal reflective surfaces 20b are linear in axial cross-section, forming the lines 21b. Nevertheless, it is preferred that substantially any photons which are emitted from the area in proximity to the point of most probable light emission 17, and which intersect the internal reflective surface 20b, have an angle of incidence with the surface 20b which is greater than or equal to the critical angle of incidence of the internal reflective surface 20b. Since the internal reflective surfaces 20b have linear axial cross-sections, the taper of those surfaces 20b is constant and does not decrease in the direction of the large planar surfaces 18. No small planar surfaces exist through which photons may escape without entering a photomultiplier. The second preferred scintillation detector 10b may be incorporated into the cell 24 and housing 27 in a manner similar to that for the first detector 10a, as illustrated in FIGS. 2, 3 and 6, to form an apparatus which is particularly suited to X-ray detection.

Figure 7:
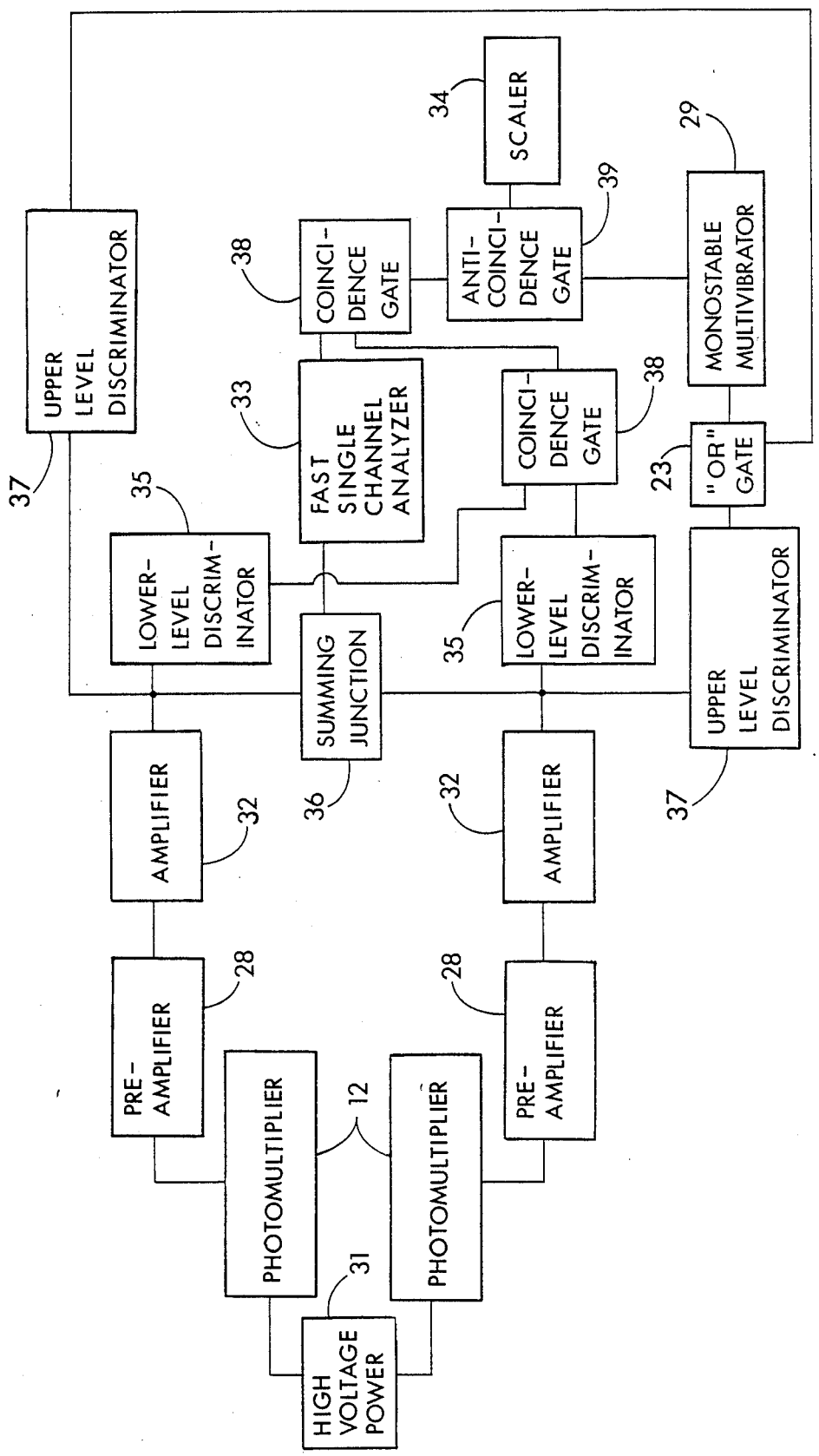
FIG. 7 shows a schematic diagram of the electronic components which are used with the first and second radiation scintillation detectors for measuring radiation.

FIG. 7 shows the major system components which are used for measuring the radioactivity in combination with either the first or second radiation scintillation detector. Each photo-multiplier 12 draws its power from a high-voltage power supply 31. The high-voltage power supply may be an ORTEC 478 or equivalent. Each photomultiplier 12 preferably is of the type which has bialkali photocathodes, which are known to have low thermionic emissions which result in "noise" or "dark current". Current from each photomultiplier tube 12 is directed to one of two preamplifiers 28 wherein the weak signal from each of the photomultipliers 12 is amplified. The signal from each preamplifier 28 is then directed to one of two amplifiers 32, and each of the amplified signals are then directed from the amplifiers 32 to one of two lower level discriminators 35 and to one of two upper level discriminators 37, which are well known in the art. Additionally, these amplified signals are also both directed to the summing junction 36. The output of each upper level discriminator 37 is directed to the "OR" gate 23, which in turn is connected to a monostable multivibrator 29. The output of the monostable is provided to an anticoincidence gate 39, which if there is afterpulse due to a high energy event, will temporarily prevent the scaler 34 from registering the event. The signal from each of the two lower level discriminators 35 is directed to a single first coincidence gate 38, the output of which is provided to a second coincidence gate 38. Additionally, the summing junction 36 directs its signal to a fast single channel analyzer 33, which in turn directs its signal to the second coincidence gate 38. An exemplary fast single channel analyzer is disclosed in Martiens, C., "Fast Single Channel Analyzer With Integrated Circuits", *The Review of Scientific Instruments*, pp. 486–87 (April 1975 by the American Institute of Physics), the disclosure of which is hereby incorporated herein by reference. Also, the high level discriminators 37 may be similar to the comparators which are disclosed in that reference. The single channel analyzer allows the pulse height spectra to be recorded without marked piled-up effects, even at counting rates greater than $10^6$ counts per second. Both the second coincidence gate 38 and monostable multivibrator 29 provide their outputs to the anticoincidence gate 39 which in turn directs its signal to the scaler 34 which provides a scaled readout of the data.

The detector in combination with its cell and electrical components forms an X-ray detection system. The preamplifiers 28, amplifiers 32, summing junction 36, fast single channel analyzer 33 and scaler 34 together form means for counting the rate at which electrical current pulses are emitted from the photomultiplier tubes. The lower level discriminators 35, and coincidence gates 38 together form means for comparing electrical current pulses from the two photomultiplier tubes and for discriminating between noise within the individual photomultiplier tubes and detected radiation events.

Afterpulses occur for several microseconds following a high energy event which may be caused by cosmic rays or detector contamination. A high energy event produces so much scintillation light that the photomultiplier tube or tubes 12 are overloaded. When either upper level discriminator 37 detects a high energy event, the electrical components, which form the "counting chain"—or means for counting the rate at which electrical currents pulses are emitted from the photomultiplier tubes 12, are disabled for several microseconds, while the photomultiplier tubes 12 recover. "High energy" is defined as an energy well above the energy of interest that the fast single channel analyzer is adjusted to observe, so that events possessing the energy of interest are not likely to trigger this afterpulse rejection circuitry. These high energy events occur infrequently—perhaps once per second.

The afterpulse rejection circuitry can be used with either one or both photomultipliers 12 in a dual or coincidence system. In FIG. 7, the upper level discriminators 37 of the afterpulse rejection circuitry are connected to the amplifiers 32 of both photomultiplier tubes 12. The use of afterpulse rejection circuitry with both photomultiplier tubes 12 is an improvement over an alternative system in which the afterpulse rejection circuitry is connected to only one of the photomultiplier tubes. The upper level discriminators 37, the "OR" gate 23, the monostable multivibrator 29 and the anticoincidence gate 39 together comprise means for detecting a high energy event within the radiation scintillation detector and for temporarily disabling the counting means upon detection of the high energy event so that afterpulses due to the event are rejected.

As described with reference to the first and second preferred radiation scintillation detectors 10a and 10b, shown in FIGS. 1–6, an X-ray beam is directed through one of the apertures 30 and one of the windows 25 toward the center of the detector between the two symmetrical portions 13. The scintillator material then gives off photons in an area in proximity to the point 17 of most probable light emission. Photons which are emitted from the area then either move toward one of the large planar surfaces 18 or toward one of the internal surfaces 20 to be totally internally reflected. Eventually, substantially all of the light emitted is transmitted through either of the planar surfaces 18 to the adjacent photomultiplier tubes 12. The current from the photomultiplier tubes 12 is then amplified and analyzed for display and/or recording at the scaler 34.

The use of a double-portioned radiation scintillation detector 10a or 10b with two photomultiplier tubes 12 is particularly advantageous. In the double-portioned detector, substantially all of the light emitted is eventually transmitted out through one of the planar surfaces 18. Additionally, since more than one escape surface is provided, the average number of reflections required for a typical photon event to reach a photomultiplier tube can be less than for a detector having a single outlet surface. The double-portioned radiation scintillation detector 10a or 10b allows the use of two photomultiplier tubes 12 which may be utilized to measure coincident events in both photomultiplier tubes, so that random photomultiplier noise may be canceled.

Figure 8:
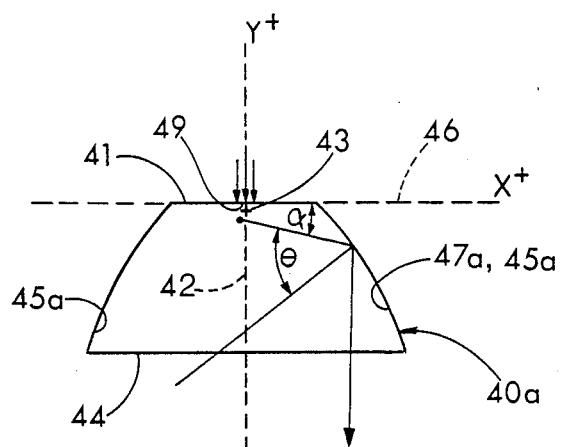
FIG. 8 shows a schematic axial cross-sectional view of a third preferred radiation scintillation detector.

As shown in FIG. 8, a third embodiment of a scintillation detector 40a in accord with the invention is formed of one quasi-conical portion only, which has a single large planar surface 44 through which the photons are transmitted to a single photomultiplier tube 12, and a small planar surface 41 through which the X-ray radiation is received. The third detector 40a, like the first and second, is a solid body of rotation about a central axis 42, and includes a point of most probable light emission 43 within the body near the location at 49 where the detector 40a is struck by the radiation, and an internal reflective surface 45a which is curvilinear in axial cross-section. As shown in FIG. 8, the X-rays are directed generally axially through the small planar surface 41. Thus the point 43 of most probable emission is located axially just inside the detector 40a near the small planar surface 41. Again, the internal reflective surface 45a is formed such that substantially any light which originates in proximity to the point 43 of most probable light emission and which intersects the internal reflective surface 45a is totally reflected internally toward the larger planar surface 44, through which the light is substantially transmitted to the photomultiplier tube 12 (not shown in FIG. 8). Thus, substantially any line segments from the point 43 to the internal reflective surface 45a, anywhere along that surface 45a, have an angle of incidence to the surface 45a greater than or equal to the critical angle of incidence.

The axial cross-sections of the internal reflective surface 45a form two continuous curves 47a which are symmetrical with respect to the central axis 42. Additionally, each continuous curve everywhere has a slope dy/dx with absolute value which is less than or equal to the absolute value of tan $$\left( \alpha \pm \frac{\pi}{2} \pm \theta_c \right),$$

where $\theta_c$ is the critical angle of incidence, the y axis is defined by the central axis, and the x axis in each axial cross-section is defined by a line which is perpendicular to the central axis and intersects the location where radiation enters the detector 40a. Furthermore, $\alpha$ is the angle measured counterclockwise between the x axis in the positive direction and a line segment from the point 43 to the internal reflective surface 45a. Preferably the scintillator medium is BC-400, BC-404, BC-450 or BC-452 polystyrene which is doped with organic scintillator as manufactured by Bicron, Inc.; or NE-102, NE-104 or Pilot B polystyrene as manufactured by Nuclear Enterprises America; or other equivalent materials.

Figure 11:
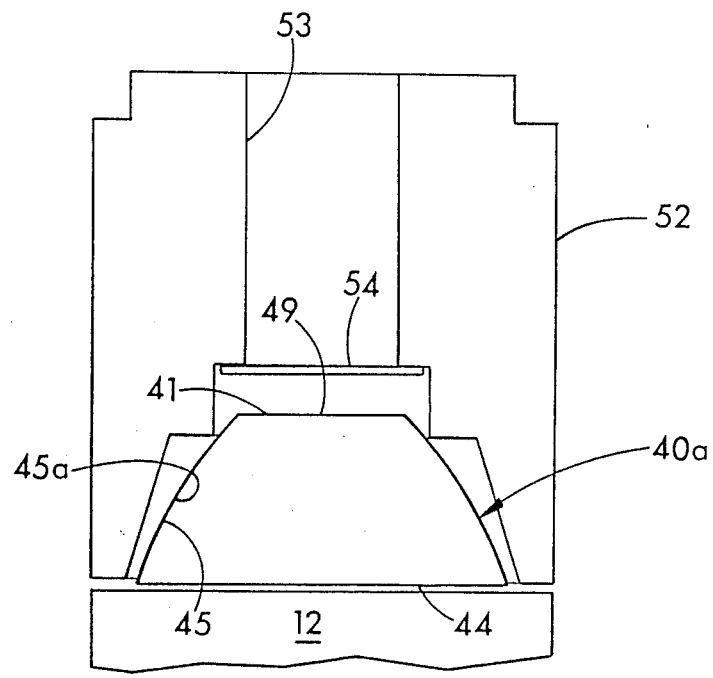
FIG. 11 shows a schematic diagram of the third preferred radiation scintillation detector within its mounting cell.

The third preferred detector 40a is shown schematically in FIG. 11 mounted within a cell 52 formed of a metallic wall which has a cavity for containing the detector 40a. The cell 52 has an entrance 53 for receiving X-rays into the cavity where the detector 40a is located. The window 53 is located so that the X-rays can be directed at the small planar surface 41 at a central position 49. Preferably the cavity is protected from visible light by closing the entrance 53 with aluminum as shown at 54. The third preferred detector 40a and cell 52 together comprise an apparatus which is particularly effective for X-ray detection.

Figure 9:
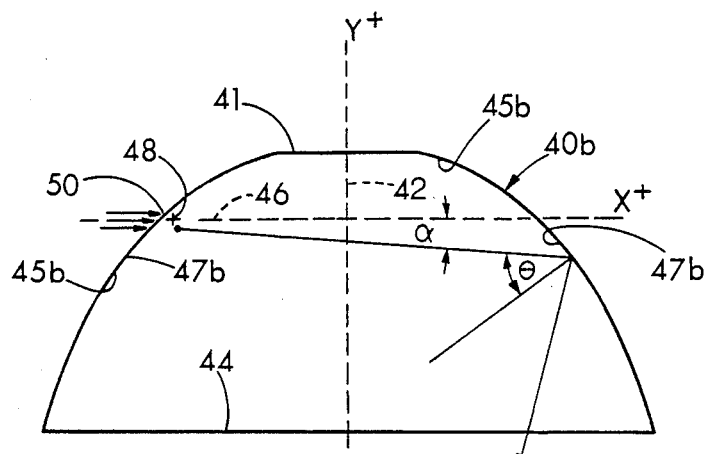
FIG. 9 shows a schematic axial cross-sectional view of a fourth preferred radiation scintillation detector

A fourth radiation scintillation detector 40b in accordance with the invention is shown in FIG. 9. The fourth detector 40b is similar to the third detector 40a shown in FIG. 8, except that the detector 40b is adapted to receive X-ray radiation passing through the surface forming the internal reflective surface 45b instead of through the small planar surface 41. Therefore, the point 48 of most probable light emission is located just inside the detector 40b near the location at 50 where the X-rays are received by the detector 40b along the x axis, as illustrated in FIG. 9. Again, substantially all photons which are emitted in proximity to the point 48 of most probable light emission, and which strike the internal reflective surface 45b, strike that surface 45b at angle of incidence which is greater than or equal to the critical angle of incidence. Since the point 48 of most probable light emission in the fourth detector 40b is located lower than that in the third detector 40a, then curves 47b formed by the axial cross-section of the internal reflective surface 45b are shaped differently than those of the third detector 40a. Nevertheless, each continuous curve 47b everywhere has a slope dy/dx with absolute value, which is less than or equal to the absolute value of tan $$\left( \alpha \pm \frac{\pi}{2} \pm \theta_c \right),$$

where $\theta_c$ is the critical angle of incidence, and $\alpha$ is the angle measured counterclockwise between the x axis in a positive direction, and a line segment from the point 48 to the internal reflective surface 45b. In any situation, the absolute value of the slope dy/dx should be everywhere about at most equal to the absolute value of tan $$\left( \alpha \pm \frac{\pi}{2} \pm \theta_c \right).$$

Again, the y axis is defined by the central axis, and the x axis in each axial cross-section is defined by a line which is perpendicular to the central axis and which intersects the location where radiation enters the detector 40b.

Figure 12:
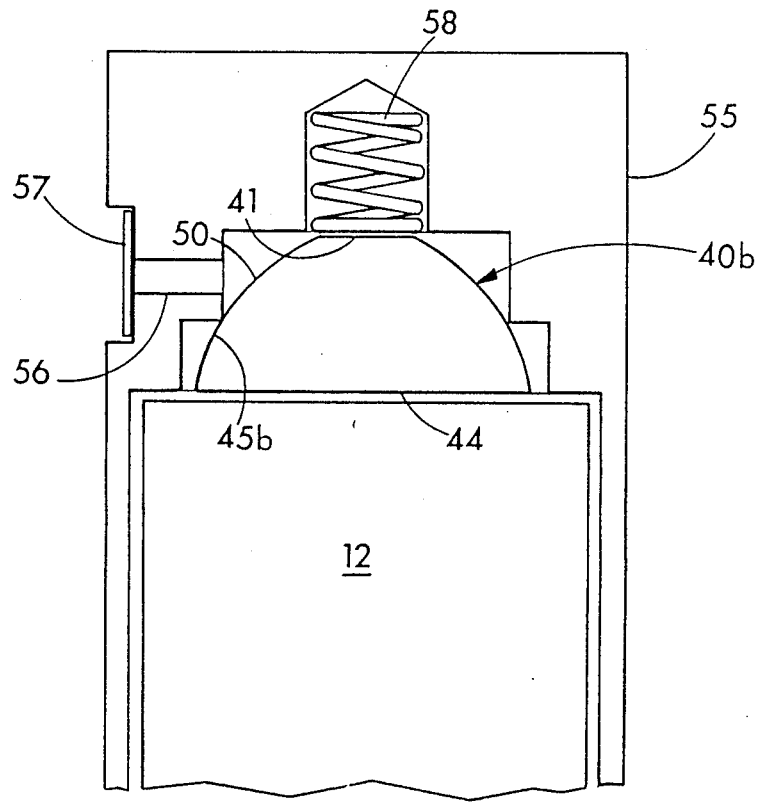
FIG. 12 shows a schematic diagram of the fourth preferred radiation scintillation detector within its mounting cell.

The detector 40b is shown schematically in FIG. 12 within a mounting cell 55 formed of a metallic wall which has a cavity for containing the detector 40b. The cell 55 has an entrance 56 which opens into the cavity so that X-rays may be received therein. Preferably the cavity is protected from visible light by a window 57 of beryllium, nickel, plastic or aluminum. The entrance 56 is located so that the X-rays can be directed at part of the detector surface which forms the internal reflective surface 45b at 50. The detector 40b is maintained in position within the cavity by a spring 58. The detector 40b and cell 55 together form an apparatus which again is particularly effective for X-ray detection.

Figure 10:
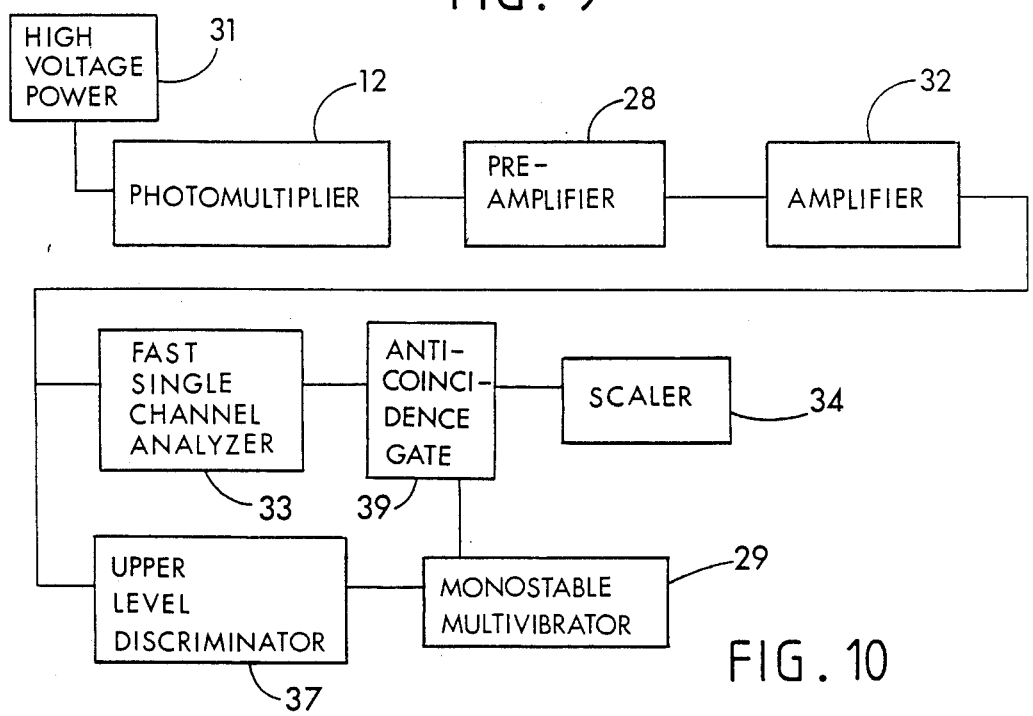
FIG. 10 shows a schematic diagram of the electronic components which are used with the third and fourth radiation scintillation detectors for measuring radiation.

FIG. 10 shows the major electronic components which may be used in combination with either the third or fourth scintillation detectors 40a or 40b to measure scintillation events. The photomultiplier tube 12 draws its power from a high voltage power supply 31 which may be an ORTEC 478 or an equivalent thereof. Current from the photomultiplier tube is directed to a preamplifier 28 where its weak signal is amplified. The preamplifier 28 signal is then in turn directed to an amplifier 32, the output of which is provided to the fast single channel analyzer 33 and an upper level discriminator 37. The upper level discriminator 37 signal is directed to a monostable multivibrator 29 which in turn directs its signal to an anticoincidence gate 39. The fast single channel analyzer also directs its signal to the anticoincidence gate 39, which in turn directs its signal to the scaler 34 which provides a scaled readout of the data. The upper level discriminator 37, monostable multivibrator 29, and anticoincidence gate 39 together operate to detect high energy events, and to disable the readout of data upon such an event, and thus together form means for detecting a high energy event within the radiation scintillation detector and for temporarily disabling the counting means upon detection of the high energy event so that afterpulses due to the event are rejected.

The third and fourth detectors 40a and 40b, in combination with their respective cells 52 and 55 and electrical components, form X-ray detection systems. The photomultiplier tube 12 provides a means for receiving light transmitted from the large planar surface 44 of the detectors and for emitting an electrical current in response thereto. The electrical components used with the third and fourth detectors 40a and 40b, other than the photomultiplier tube 12, form means for counting the rate at which the electrical current pulses are emitted from the photomultiplier tube means.

During operation, X-ray radiation is directed into the third scintillation detector 40a along the central axis 42 so that the beam enters the detector 40a through the smaller planar surface 41 at a position 49. The scintillator material from which the detector 40a is formed then emits photons in the area centered around the point of most probable light emission 43. Photons from this area are again said to be emitted "in proximity to" the point of most probable emission. Many of these photons are directed toward the larger planar surface 44, and then are transmitted directly through that surface 44 to a photomultiplier tube 12. Additionally, many of the photons are directed toward the internal reflective surface 45a, and then are totally internally reflected toward the larger planar surface 44 where the photons then are transmitted to the photomultiplier tube 12. However, in this particular embodiment, some of the photons do make their way toward the smaller planar surface 41 where they may escape the radiation scintillation detector 40a without detection. Nevertheless, the decreasing taper of the internal reflective surface 45a ensures that substantially all of the photons emitted are transmitted across the relatively small cross-sectional area of the large planar surface 44 to a photomultiplier tube.

The fourth preferred detector 40b operates in a similar manner, except that the X-ray radiation is directed into the detector 40b through the surface forming the internal reflective surface 45b at 50. Again, the decreasing taper of the internal reflective surface 45b ensures that a large percentage of the photons emitted are transmitted to the photomultiplier tube 12 across a relative small cross-sectional area. It should be noted that with any of the four embodiments 10a, 10b, 40a and 40b, some photons will be lost by escape through the surface near where the radiation strikes the detector, since right near the point of most probable light emission, the angle of incidence to that surface will be quite small. Additionally, some photons may escape through the small planar surface of the detectors 40a and 40b. Some light is reabsorbed by the scintillator material as well. Thus, the qualifier "substantially" is used when indicating that substantially all of the photons emitted eventually are directed out the large planar surfaces.

With any of these radiation scintillation detectors 10a, 10b, 40a or 40b, it may be desirable to fill the interface between the detector and the photomultiplier tube 12 with an optical coupling fluid of the same index of refraction as the scintillator material. High viscosity silicon oil is commonly used as a coupling agent between detectors and photomultiplier tubes.

The radiation scintillation detectors 10 and 40 disclosed herein are formed of plastic, in which a scintillator medium is mixed with a polymer resin such as styrene and molded or machined into the desired shape. Alternatively, a liquid radiation scintillation detector may be formed which has the same internal reflective surfaces described herein. Such a liquid detector would be considered to be within the scope of this invention.

It is understood that the invention is not confined to the particular embodiments herein illustrated and described but embraces such modified forms thereof as come within the scope of the following claims.

What is claimed is:

1. A radiation scintillation detector comprising:
a solid body of rotation about a central axis, the body formed of a scintillator medium having a particular index of refraction and including: at least one point of most probable light emission within the body near where radiation is to be received by the detector; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and a wavelength of the light emitted by the scintillator medium, so that substantially any light originating from the area in proximity to the point of most probable light emission which intersects the internal reflective surface is totally reflected internally; and a planar surface through which the light is substantially transmitted out of the body, the internal reflecting surface having decreasing taper as it approaches the planar surface.

2. The detector of claim 1 wherein the scintillator medium is selected from the group of BC-400, BC-404, BC-450, BC-452, NE-102, NE-104 and Pilot B plastic scintillator.

3. A radiation scintillation detector comprising:

a solid body of rotation about a central axis, the body formed of a scintillator medium having a particular index of refraction and including: at least one point of most probable light emission within the body near where radiation is to be received by the detector; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and a wavelength of the light emitted by the scintillator medium, so that substantially any light originating from the area in proximity to the point of most probable light emission which intersects the internal reflective surface is totally reflected internally; and a planar surface through which the light is substantially transmitted out of the body, wherein all axial cross-sections of the internal reflecting surface form tow continuous curves which are symmetrical with respect to the central axis.

4. The detector of claim 3 wherein each continuous curve substantially everywhere has a slope dy/dx with an absolute value which is less than or equal to an absolute value of tan $$\left(\alpha \pm \frac{\pi}{2} \pm \theta_c\right),$$

wherein $\theta_c$ is the critical angle of incidence, a y-axis is defend by the central axis, an x-axis is defined by a line contained in each axial cross-section perpendicular to the central axis and intersecting a location where radiation is received by the detector, and $\alpha$ is an angle measured counterclockwise between the x-axis in a positive direction and a line segment from said point to the internal reflective surface.

5. A radiation scintillation detector comprising:
a solid body of rotation about a central axis, the body formed of a scintillator medium having a particular index of refraction and including: at least one point of most probable light emission within the body near where radiation is to be received by the detector; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and a wavelength of the light emitted by the scintillator medium, so that substantially any light originating from the area in proximity to the point of most probable light emission which intersects the internal reflective surface is totally reflected internally; and a planar surface through which the light is substantially transmitted out of the body, wherein the body comprises two integrally joined portions located on opposite sides of a plane perpendicular to the central axis, and which are symmetrical to each other with respect to that plane, each portion including one of said internal reflecting surfaces, wherein all axial cross-sections of the internal reflective surface of each portion form two continuous curves which are symmetrical with respect to the central axis.

6. The detector of claim 5 wherein the point of most probable light emission is located in the plane near a location where radiation is received by the detector.

7. A radiation scintillation detector comprising:
a solid body of rotation about a central axis, the body formed of a scintillator medium having a particular index of refraction and at least one point of most probable light emission near a location where radiation is received by the detector, and including two portions which are integrally joined and which are located on opposite sides of a plane perpendicular to the central axis at which the position of most probable light emission is located, each portion including an internal reflective surface which has an axial cross-section which tapers inwardly toward the plane at which the two portions are joined wherein substantially any line segment from an area in proximity to the point of most portable light emission to the internal reflective surface anywhere along that surface has an angle of incidence to the surface at least as great as a critical angle of incidence determined by the scintillator medium, a surrounding medium adjacent to the body along the internal reflective surfaces, and a wavelength of the light emitted by the scintillator medium, so that substantially any light originating from the area in proximity to the point of most probable light emission which intersects the internal reflective surface is totally reflected internally, each portion further including a planar surface through which the light is substantially transmitted out of the body.

8. The detector of claim 7 wherein the scintillator medium is selected from the group of BC-400, BC-404, BC-450, BC-452, NE-102, NE-104 and Pilot B plastic scintillator.

9. A radiation scintillation detector comprising:
a solid body of rotation about a central axis, the body formed of a scintillator medium having a particular index of refraction and at least one point of most probable light emission near a location where radiation is received by the detector, and including two portions which are integrally joined and which are located on opposite sides of a plane perpendicular to the central axis, each portion including an internal reflective surface which has an axial cross-section wherein substantially any line segment from an area in proximity to the point of most portable light emission to the internal reflective surface anywhere along that surface has an angle of incidence to the surface at least as great as a critical angle of incidence determined by the scintillator medium, a surrounding medium adjacent to the body along the internal reflective surfaces, and a wavelength of the light emitted by the scintillator medium, so that substantially any light originating from the area in proximity to the point of most probable light emission which intersects the internal reflective surface is totally reflected internally, each portion further including a planar surface through which the light is substantially transmitted out of the body, wherein all axial cross-sections of the internal reflective surface of each portion form two continuous curves which are symmetrical with respect to the central axis.

10. The detector of claim 9 wherein each continuous curve substantially everywhere has a slope dy/dx with an absolute value which is about at most equal to an absolute value of tan $$\left(\alpha \pm \frac{\pi}{2} \pm \theta_c\right),$$

wherein $\theta_c$ is the critical angle of incidence, a y-axis is defend by the central axis, an x-axis is defined by a line contained in each axial cross-section perpendicular to the central axis and intersecting a location where radiation is received by the detector, and $\alpha$ is an angle measured counterclockwise between the x-axis in a positive direction and a line segment from said point to the internal reflective surface.

11. Apparatus for radiation detection, comprising:
    (a) a mounting cell including a wall which forms a cavity therein and an entrance which opens into the cavity for receiving radiation therein; and
    (b) a radiation scintillation detector substantially contained within the cell and comprising a solid body of rotation about a central axis, the body formed of a scintillator medium having a particular index of refraction and including: at least one point of most probable light emission within the body near where radiation is to be received by the detector through the entrance; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and within the cell, and a wavelength of the light emitted by the scintillator medium, so that substantially any light originating from the area in proximity to said point which intersects the internal reflective surface is totally reflected internally; and a planar surface through which the light is substantially transmitted out of the body, the internal reflecting surface having decreasing taper as it approaches the planar surface.

12. Apparatus for radiation detection, comprising:
    (a) a mounting cell including a wall which forms a cavity therein and an entrance which opens into the cavity for receiving radiation therein; and
    (b) a radiation scintillation detector substantially contained within the cell and comprising a solid body of rotation about a central axis, the body formed of a scintillator medium having a particular index of refraction and including: at least one point of most probable light emission within the body near where radiation is to be received by the detector through the entrance; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and within the cell, and a wavelength of the light emitted by the scintillator medium, so that substantially any light originating from the area in proximity to said point which intersects the internal reflective surface is totally reflected internally; and a planar surface through which the light is substantially transmitted out of the body, wherein the internal reflecting surface has an axial cross-section defining a continuous curve which substantially everywhere has a slope dy/dz with an absolute value which is less than or equal to an absolute value of tan $$\left(\alpha + \frac{\pi}{2} + \theta_c\right),$$

wherein $\theta_c$ is the critical angle of incidence, a y-axis is defined by the central axis, an x-axis is defined by a line contained in each axial cross-section perpendicular to the central axis and intersecting a location where radiation is received by the detector, and $\alpha$ is an angle measured counterclockwise between the x-axis in a positive direction and a line segment from said point to the internal reflective surface.

13. Apparatus for radiation detection, comprising:
    (a) a mounting cell including a wall which forms a cavity therein and an entrance which opens into the cavity for receiving radiation therein; and
    (b) a radiation scintillation detector substantially contained within the cavity and comprising a solid body of rotation about a central axis, the body formed of a scintillator medium having a particular index of refraction and at least one point of most probable light emission near a location where radiation is received by the detector through the entrance, and including two portions which are integrally joined and which are located on opposite sides of a plane perpendicular to the central axis at which the position of most probable light emission is located, each portion including an internal reflective surface which has an axial cross-section which tapers inwardly toward the plane at which the two portions are joined wherein substantially any line segment from an area in proximity to the point of most portable light emission to the internal reflective surface anywhere along that surface has an angle of incidence to said surface at least as great as a critical angle of incidence determined by the scintillator medium, a surrounding medium adjacent to the body along the internal reflective surface, and within the cell, and a wavelength of the light emitted by the scintillator medium, so that substantially any light originating from the area in proximity to the pont of most probable light emission which intersects the internal reflective surface is totally reflected internally, each portion further including a planar surface through which the light is substantially transmitted out of the body.

14. Apparatus for radiation detection, comprising:
    (a) a mounting cell including a wall which forms a cavity therein and an entrance which opens into the cavity for receiving radiation therein; and (b) a radiation scintillation detector substantially contained within the cell and comprising a solid body of rotation about a central axis, the body formed of a scintillator medium having a particular index of refraction and at least one point of most probable light emission near a location where radiation is to be received by the detector through the entrance, and including two portions which are integrally joined and which are located on opposite sides of a plane perpendicular to the central axis, each portion including an internal reflective surface which has an axial cross-section wherein substantially any line segment from an area in proximity to the point of most portable light emission to the internal reflective surface anywhere along that surface has an angle of incidence to the surface at least as great as a critical angle of incidence determined by the scintillator medium, a surrounding medium adjacent to the body along the internal reflective surfaces and within the cell, and a wavelength of the light emitted by the scintillator medium, so that substantially any light originating from the area in proximity to the pont of most probably light emission which intersects the internal reflective surface is totally reflected internally, each portion further including a planar surface through which the light is substantially transmitted out of the body, wherein the internal reflecting surface has an axial cross-section defining a continuous curve which substantially everywhere has a slope dy/dz with an absolute value which is about at most equal to an absolute value of tan $$\left(\alpha + \frac{\pi}{2} + \theta_c\right),$$

wherein $\theta_c$ is the critical angle of incidence, a y-axis is defined by the central axis, an x-axis is defined by a line contained in each axial cross-section perpendicular to the central axis and intersecting a location where radiation is received by the detector, and $\alpha$ is an angle measured counterclockwise between the x-axis in a positive direction and a line segment from said point to the internal reflective surface.

15. An X-ray detection system comprising:
(a) a mounting cell including a wall which forms a cavity therein and an entrance which opens into the cavity for receiving radiation therein;
(b) a radiation scintillation detector substantially contained within the cell and comprising a solid body of rotation about a central axis, the body formed of a scintillator medium having a particular index of refraction and including: at least one point of most probable light emission within the body near where radiation is to be received by the detector through the entrance; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and within the cell, and a wavelength of the light emitted by the scintillator medium, so that substantially any light originating from the area in proximity to the pont of most probable light emission which intersects the internal reflective surface is totally reflected internally; and a planar surface through which the light is substantially transmitted out of the body, the internal reflecting surface having decreasing taper as it approaches the planar surface;
(c) photomultiplier tube means adjacent to the planar surface of the detector for receiving light transmitted from the planar surface and for emitting an electrical current in response thereto; and
(d) means for counting electrical current pulses emitted from the photomultiplier tube means.

16. The system of claim 15 further including means for detecting a high energy event within the radiation scintillation detector and for temporarily disabling the counting means upon detection of the high energy event so that afterpulses due to the event are rejected.

17. An X-ray detection system comprising:
(a) a mounting cell including a wall which forms a cavity therein and an entrance which opens into the cavity for receiving radiation therein;
(b) a radiation scintillation detector substantially contained within the cell and comprising a solid body of rotation about a central axis, the body formed of a scintillator medium having a particular index of refraction and including: at least one point of most probable light emission within the body near where radiation is to be received by the detector through the entrance; at least one internal reflective surface which has a curvilinear axial cross-section wherein substantially any line segment originating from an area in proximity to the point of most portable light emission and ending on the internal reflective surface anywhere along that surface has an angle of incidence to said surface at least as great as a critical angle of incidence determined by the scintillator medium, a surrounding medium adjacent to the body along the internal reflective surface, and within the cell, and a wavelength of the light emitted by the scintillator medium, so that substantially any light originating from the area in proximity to the pont of most probable light emission which intersects the internal reflective surface is totally reflected internally; and a planar surface through which the light is substantially transmitted out of the body;
(c) photomultiplier tube means adjacent to the planar surface of the detector for receiving light transmitted from the planar surface and for emitting an electrical current in response thereto; and
(d) means for counting electrical current pulses emitted from the photomultiplier tube means;
wherein the body comprises two integrally joined portions located on opposite sides of a plane perpendicular to the central axis, and which are symmetrical to each other with respect to that plane, each portion including one of the internal reflective surfaces and one of the planar surfaces; wherein all axial cross-sections of the internal reflective surface of each portion form two continuous curves which are symmetrical with respect to the axis; and wherein the photomultiplier tube means includes two photomultiplier tubes which are each adjacent to one of the planar surfaces of the detector, and the system further including means for comparing electrical current pulses from the two photomultiplier tubes and for discriminating between noise within the individual photomultiplier tubes and radiation events.

18. An X-ray detection system comprising:
(a) a mounting cell including a wall which forms a cavity therein and an entrance which opens into the cavity for receiving radiation therein;
(b) a radiation scintillation detector substantially contained within the cell and comprising a solid body of rotation about a central axis, the body formed of a scintillator medium having a particular index of refraction and at least one point of most probable light emission near a location where radiation is received by the detector through the entrance, and including two portions which are integrally joined and which are located on opposite sides of a plane perpendicular to the central axis, each portion including an internal reflective surface which has an axial cross-section wherein substantially any line segment from an area in proximity to the point of most portable light emission to the internal reflective surface anywhere along that surface has an angle of incidence to said surface at least as great as a critical angle of incidence determined by the scintillator medium, a surrounding medium adjacent to the body along the internal reflective surfaces, and within the cell, and a wavelength of the light emitted by the scintillator medium, so that substantially any light originating from the area in proximity to said point which intersects the internal reflective surface is totally reflected internally, each portion further including a planar surface through which the light is substantially transmitted out of the body;
(c) two photomultiplier tube, one adjacent to each of the planar surface of the detector to receive light transmitted through the planar surface and to emit an electrical current in response thereto; and
(d) means for counting electrical current pulses emitted from each photomultiplier tube.

19. The system of claim 18 wherein the system further included means for comparing electrical current pulses from the two photomultiplier tubes and for discriminating between noise within the individual photomultiplier tubes and radiation events.

20. The system of claim 18 further including means for detecting a high energy event within the radiation scintillation detector and for temporarily disabling the counting means upon detection of the high energy event so that afterpulses due to the event are rejected.

* * * * *

UNITED STATES PATENT AND TRADEMARK OFFICE
CERTIFICATE OF CORRECTION

PATENT NO. : 4,956,556

DATED : September 11, 1990

INVENTOR(S) : Jeffrey L. Radtke

It is certified that error appears in the above-identified patent and that said Letters Patent is hereby corrected as shown below:

```
Column 6, line 24, "αand" should be --α and--.
Column 13, line 25, "tow" should be --two--.
Column 13, line 52, "portable" should be --probable--.
Column 14, line 24, "portable" should be --probable--.
Column 14, line 55, "portable" should be --probable--.
Column 16, line 51, "portable" should be --probable--.
Column 16, line 60, "pont" should be --point--.
Column 17, line 2, "cell" should be --cavity--.
Column 17, line 6, "to" should be deleted.
Column 17, line 7, "be" should be deleted.
Column 17, line 23, "probably" should be --probable--.
Column 17, line 60, "portable" should be --probable--.
Column 18, line 2, "pont" should be --point--.
Column 18, line 34, "portable" should be --probable--.
Column 18, line 45, "pont" should be --point--.
Column 19, line 10, "cell" should be --cavity--.
Column 19, line 22, "portable" should be --probable--.
Column 20, line 10, "tube," should be --tubes,--.
```

UNITED STATES PATENT AND TRADEMARK OFFICE
CERTIFICATE OF CORRECTION

PATENT NO. : 4,956,556
DATED : September 11, 1990
INVENTOR(S) : Jeffrey L. Radtke It is certified that error appears in the above-indentified patent and that said Letters Patent is hereby corrected as shown below:

Column 20, line 11, "surface" should be --surfaces--.
Column 17, line 23, "Pont" should read --Point--.

Signed and Sealed this

Twelfth Day of October, 1993

Attest:

BRUCE LEHMAN

Attesting Officer   Commissioner of Patents and Trademarks